May 22, 1945.  S. A. SCHERBATSKOY ET AL  2,376,821
WELL LOGGING INSTRUMENT
Original Filed Sept. 15, 1941   4 Sheets-Sheet 2
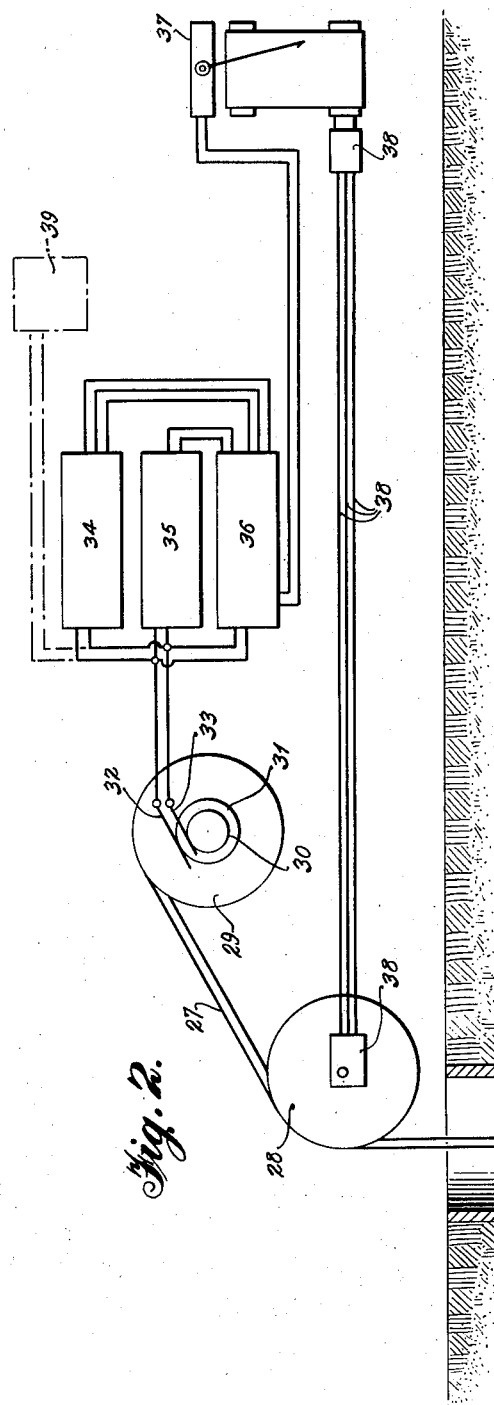
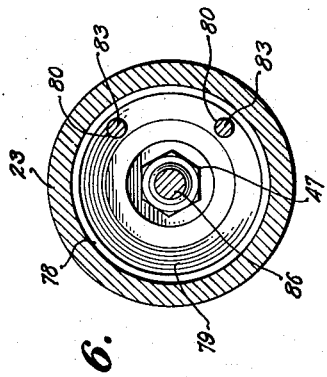
Fig. 6.
Fig. 2.
Inventors
SERGE A. SCHERBATSKOY,
GILBERT SWIFT,
ROBERT E. FEARON AND
JACOB NEUFELD
By Stevens and Davis  Attorneys

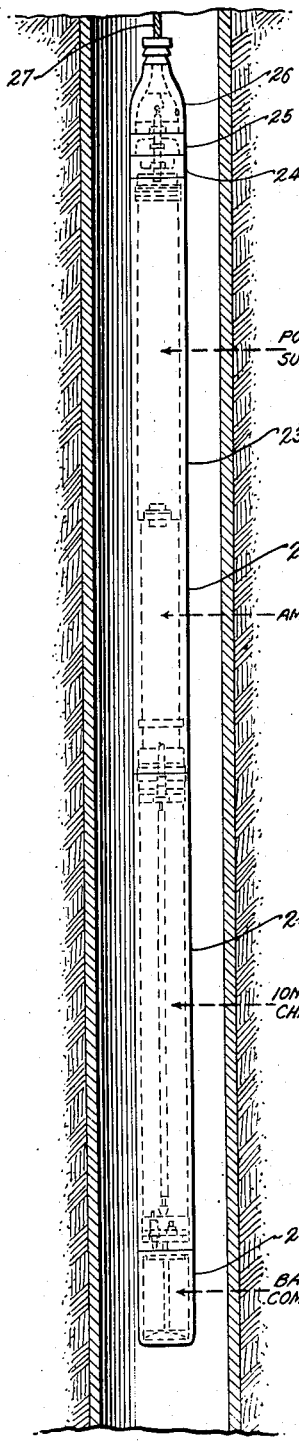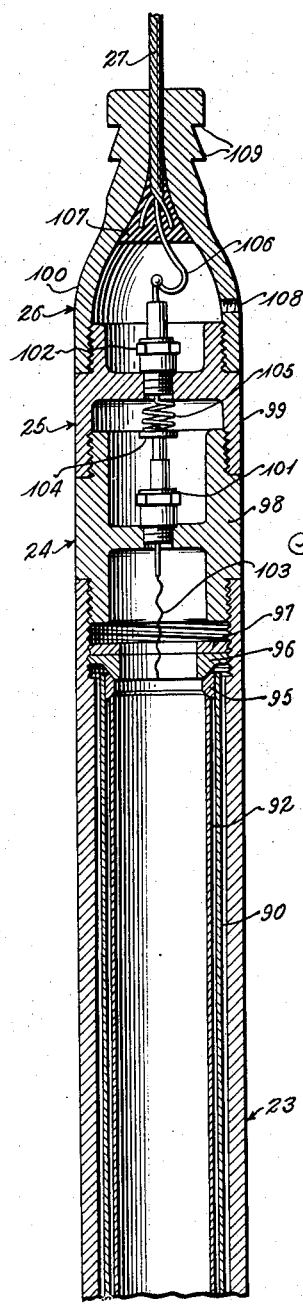

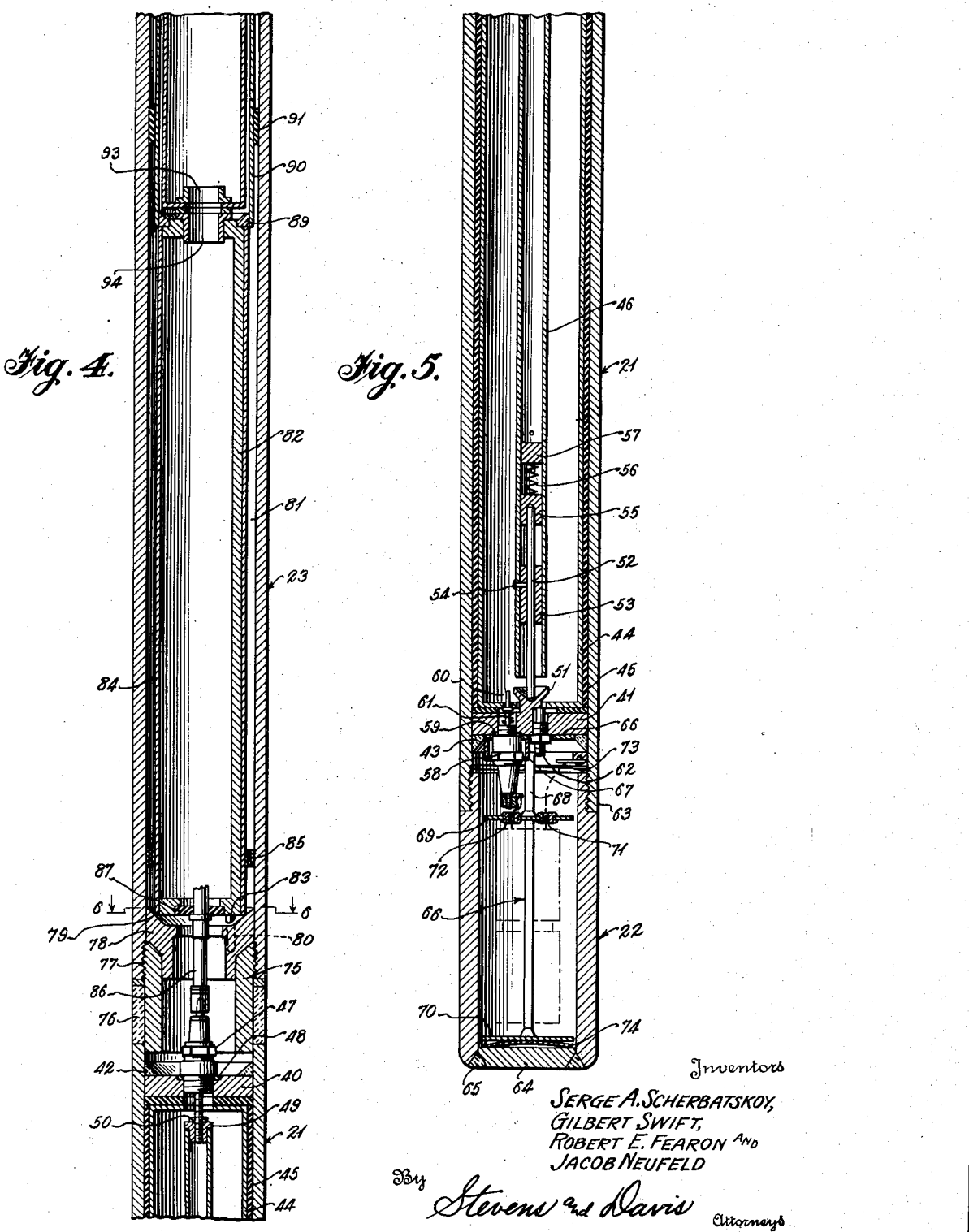

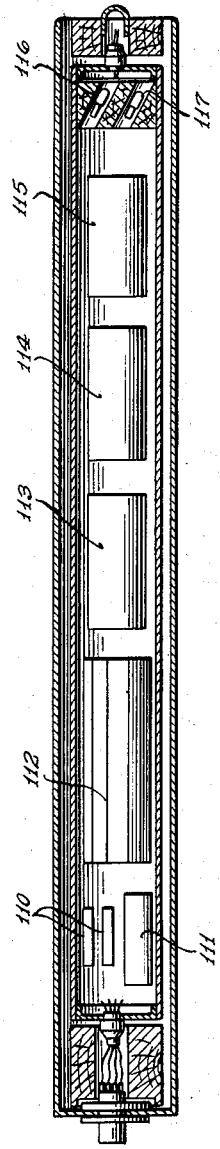
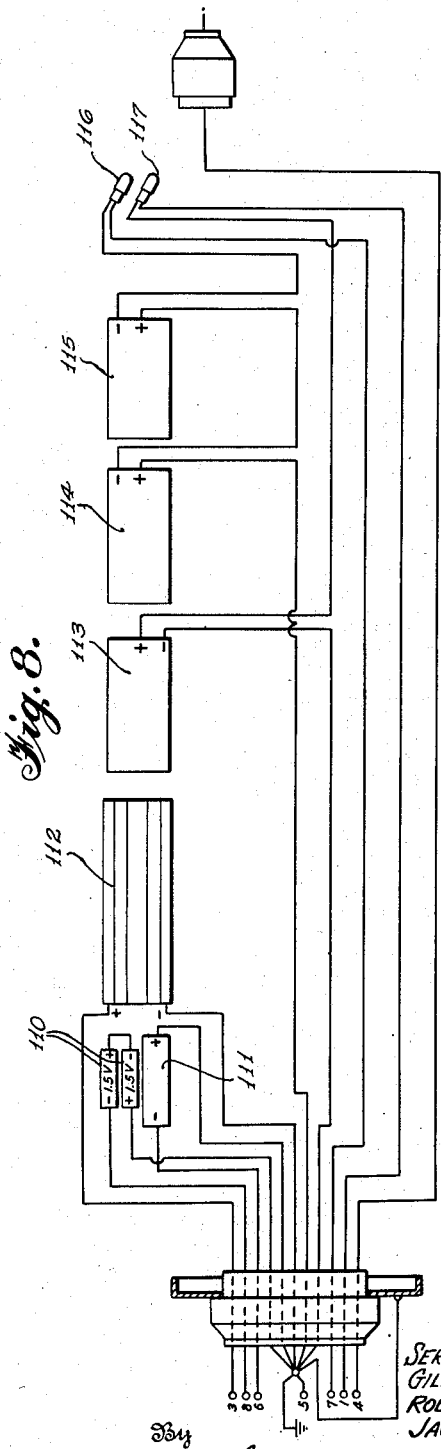

Patented May 22, 1945

2,376,821

UNITED STATES PATENT OFFICE

2,376,821

WELL LOGGING INSTRUMENT

Serge Alexander Scherbatskoy, Robert Earl Fearon, and Jacob Neufeld, Tulsa, Okla., and Gilbert Swift, Red Bank, N. J., assignors to Well Surveys, Incorporated, Tulsa, Okla., a corporation of Delaware Original application September 15, 1941, Serial No. 410,954. Divided and this application May 22, 1943, Serial No. 488,102

5 Claims. (Cl. 250—83.6)

This invention relates to geophysical prospecting and more particularly to well logging by the measurement of gamma rays or other radiations at various depths in drill holes or the like, and is a division of our co-pending application, Serial Number 410,954, filed September 15, 1941.

It has already been found advantageous to lower various types of measuring equipment into wells or other openings in the earth and to make a series of measurements therein that will provide a parameter of something related to the structure surrounding the well bore, in correlation with depth. These parameters are commonly referred to as "well logs." They are generally formed by making a continuous series of measurements of some kind in a well bore over a continuous range of depths and plotting the measurements graphically so as to give a continuous curve of depth versus the magnitude of the characteristic being measured.

There are many examples of the making of this kind of measurements, probably the most common being the measurement of the resistivity of the strata at various depths. The temperature, natural potentials of the strata and many other characteristics have also been measured in a similar manner. Recently, it has been found that radioactive radiations emanating from the strata, for example, gamma rays can be measured and correlated with depth in a similar manner and that there are many advantages to measuring them as indications of the nature of adjacent geological formations.

Gamma rays, neutrons and the like penetrate metal with relatively little difficulty and hence measurements of these radiations may be made even in a well that has already been lined with a steel casing and with an instrument which itself is enclosed in a steel capsule. Furthermore, almost all natural substances are radioactive and the extent of their radioactivity is a good index of their nature. Still further, not only the intensity but also the nature of the radiations are different when they come from different formations and determinations can be made of the differences in types of radiation as well as the differences in intensity. Then too, radiations may be artificially introduced into the surrounding strata by a source of radiation lowered into the drill hole and the effect or action of these radiations may be determined.

Work on the detection of radiations of this type has already passed beyond the experimental stage and measurements have actually been made through casing, on a commercial scale, of the naturally emitted gamma radiations of the surrounding formations. The information thus obtained has proven very valuable as an indication of the nature of surrounding geological formations.

Despite the successful measurement of gamma radiations, many difficulties have been encountered with the equipment originally proposed for the purpose. The original instruments were not as sensitive as was desired. The capsules in which they were enclosed were not strong enough to withstand the terrific pressures encountered at great depths, could not be sealed tightly enough to prevent leakage, and were too large to be inserted in a hole of small diameter. The detector and other equipment lowered into the well were not sturdy enough to withstand the mechanical shocks received in normal field use. The power supply was not steady enough. The measurements could not be accurately transmitted to the surface. The instrument could not readily be assembled and disassembled so that building and repairing it were long tedious processes.

The purpose of the present invention is to eliminate as many as possible of the objectionable features from the equipment originally proposed for radiation well logging and to provide an instrument to be lowered into a well, and surface equipment to go with it, which will be highly sensitive, be very accurate, be so sturdy that it will not be injured by any of the things that may normally happen in the field use of the instrument and that will be so constructed that the component parts may be readily removed for repair or replacement.

The ionization chamber which receives the radiations from the surrounding strata has, to this end, been arranged to occupy the full cross-section of the instrument. It comprises a steel shell which at once forms a portion of the outer casing of the instrument and at the same time, the outer wall of the ionization chamber. Within this shell and insulated therefrom is an outer cylindrical electrode and an inner rod-like electrode. An electrical connection from each is carried through an end wall of the chamber by an insulated conductor very much like the ordinary automobile spark plug. In fact, automobile spark plugs have been slightly altered and used for this purpose. The inner electrode is shock mounted and insulated from the casing by a quartz rod spring mounted in one end of the electrode and by one of the spark plug like structures at the other. Such a structure provides an ionization chamber of considerable volume without making necessary a very large outside diameter for the instrument and at the same time permits the reduction of leakage current so that very fine and at the same time very accurate measurements may be made. As will be seen later, the electrical connection between the battery which applies potential across the electrodes, the electrodes themselves, and the casing, are such that what little leakage there is tends to be between the electrodes and the casing instead of between the electrodes themselves and this leakage is ignored by the measuring circuit.

Removably connected to the section of the casing which forms the ionization chamber there is at least one more section of casing of the same outside diameter and within this section of casing are positioned two more units of the instrument. The first, which is positioned directly above the ionization chamber, is a unit which measures the flow of current in the ionization chamber and sends an appropriate electrical signal to the surface of the earth. The second, which is positioned above the first, contains a source of electrical power for operating the measuring circuit. It may also contain a source of power for applying voltage across the electrodes of the ionization chamber, or, alternatively, this source of power may be contained in a separate section of the instrument casing removably attached below the ionization chamber.

In order to expedite the removal of the two units of the instrument which are placed above the ionization chamber, the lower of these two units is formed to extend from the ionization chamber to a point adjacent the top of the section of casing within which it is contained. The upper portion of this unit, however, is merely a hollow shell in which the second or upper of the two units may be positioned. Means are then provided for sealing the upper end of the casing against the entrance of fluids from the surrounding well bore, connecting the casing to a supporting cable, and making electrical connections to the conductor inside this cable so that current may be transmitted to and from the surface through a single conductor inside of the cable.

In order that the ionization chamber may be as sensitve and as accurate in its indications as possible, and in order to minimize the errors that may occur in the transmission of the indicating signals to the surface of the earth a "null" type of measuring circuit has been devised. Accordingly, the outer electrode of the ionization chamber has been connected through a battery or other source of voltage to the casing and the inner electrode has been connected through a relatively high resistance resistor also to the casing. By connecting the outer electrode through the battery to the casing the major part of any leakage that occurs will be between the outer electrode and the casing and this will not affect the current flowing through the resistor.

Originally, the voltage drop across the resistor was used, directly, to govern an amplifier, but this has been changed, a second resistor has been inserted and an arrangement made so that current from apparatus on the surface of the earth can pass through this second resistor to make the potential drop across it equal to that across the first resistor when the system is in a state of balance, so that there is then no voltage across the two resistors when placed in series, as they are in the present arrangement.

In order to make this system an operative null system, any overall potential developed across the two resistors is used to operate, through a capacitative commutator, an alternating current amplifier, which sends its signals to the surface of the earth, where these signals cause a readjustment in the current sent through the balancing resistor. As soon as the state of balance is reached the signal to the surface ceases, the system is in balance and a record of the current being sent to the balancing resistor is recorded as an indication of the gamma radiation at the particular point in the well.

It has been found desirable to commutate the current sent to the surface and amplify this current by an alternating current amplifier in order to prevent the usual drift of a direct current amplifier from affecting the accuracy of the measurement. This has necessitated some arrangement whereby the surface equipment can be made to adjust the balancing current in the proper direction, since an unbalance in either direction will cause an alternating current signal to be sent to the surface. To this end a second alternating current signal is sent to the surface from the operating circuit of the capacitative commutator and the phase relation between this second current and the signal current are there used to determine the direction in which the balancing current must be adjusted in order to balance the circuit.

As can be seen from the foregoing description, the arrangement so far described necessitates the sending to the surface of two different alternating currents and the return to the instrument of at least one direct current for balancing purposes. Multi-conductor cables however are both expensive and difficult to maintain and an arrangement has therefore been devised by which the two alternating currents may be made to have different frequencies, transmitted over the same cable, and at the same time not interfere with the transmission of the direct current over the same cable. This is accomplished by a proper arrangement of frequencies and filtering circuits. The signal current is ordinarily caused to have a frequency of around 74 cycles, the phasing current, a frequency of around 592 cycles and the balancing current is substantially direct current.

If batteries are used as the entire source of power within the instrument, then it is not necessary to conduct any other current over the single conductor cable that supports the instrument, but when it is desired to supply power from the surface of the earth to operate either the measuring circuit, the ionization chamber or both then a current which is of still a different frequency may be sent down into the well over the same cable and separated in the measuring instrument from the other currents by appropriate filters. It has been found that a current having a frequency of 5 kilocycles is satisfactory for this purpose.

When batteries are used to supply the power to the measuring circuit they are contained in the upper of the two units above the ionization chamber and connected through a plug and socket arrangement to the unit which contains the measuring circuit. The measuring circuit is similarly connected by a plug and socket arrangement to the ionization chamber. It has been found particularly desirable in case batteries are used to place in the battery compartment one or more switches which are gravity actuated so that when the unit is removed from the well and laid on its side the batteries will be disconnected and the measuring circuit thereby stopped from operation.

When power is to be sent from the surface, appropriate filters and rectifiers are contained within the upper limit of the measuring instrument so that the power from the surface is properly separated from the other currents in the supporting cable, rectified, filtered as necessary, and the proper voltages applied to the various parts of the measuring circuit. Such a power pack arrangement may be arranged to supply voltage across the ionization chamber as well as to the measuring circuit but ordinarily this will not be found to be desirable and the ionization chamber will be supplied with voltage by a separate battery.

At the surface of the earth the supporting cable for the measuring instrument passes over a wheel which is connected through either an electrical or a mechanical transmission system to a recorder so that the recorder tape moves as the measuring instrument moves up and down in the well. The supporting cable is then wound on to a cable drum through which connections are made by slip rings and brushes from the center conductor and the cable itself to a series of three panels interconnected so that one panel detects and amplifies the signal current, another detects and amplifies the phasing current and the third compares the resultant currents and properly adjusts the balancing direct current sent back to the measuring instrument, at the same time actuating the recorder so that it records the amount of balancing current sent back to the well. In addition, a source of power may be connected into the surface circuit to supply power to the instrument in the well. This of course is used only in case a power pack is used in the well instead of batteries.

Numerous addiitonal details of the device of this invention and numerous advantages not heretofore mentioned will be evident from the following detailed description of this device and from the appended drawings. It is to be understood, however, that while the device illustrated in the drawings is the preferred form and many of its details form important parts of this invention, that the invention is not limited to the combination of all of the parts shown in the appended drawings or described in the following detailed description, or even to the exact embodiment of any one of the many details.

In the drawings:

Figure 1 is an elevation, partly in section showing the measuring instrument as a whole, in the position in which it will normally operate;

Figure 2 is a diagrammatic illustration of the surface equipment which together with the instrument of Figure 1 forms a complete apparatus;

Figures 3, 4 and 5 are sectional elevational views on a much larger scale than Figure 1, illustrating, when taken together, the more detailed construction of the measuring instrument;

Figure 6 is a sectional view of the measuring instrument taken on line 6—6 of Figure 4;

Figure 7 is an elevational view partly in section of the battery unit of the measuring instrument; and Figure 8 is a wiring diagram of the same battery unit.

As specifically illustrated in Figures 1 and 2 the measuring instrument 20 comprises an elongated steel tube made up of several sections. Starting with the section 21 which forms at once the outside wall of the instrument and the outer wall of the ionization chamber there is attached to the lower end of this section a second section 22 of the same diameter, which section is sealed at its lower end and contains batteries which apply potential across the electrodes of the ionization chamber. Above the ionization chamber section 21 is a third section 23, also of the same diameter as the ionization chamber and this section encloses the measuring circuit unit and the power supply unit of the device. Above the third section 23 are two short sections 24 and 25, each of the same diameter as the remainder of the casing, and above these is a member 26 specially constructed to receive and hold the lower end of a supporting cable 27.

On the surface of the earth is positioned a measuring wheel 28 over which the cable 27 passes to a cable drum 29 driven by a source of power not shown to raise and lower the instrument in the well. Connections inside of the cable drum 29 carry the currents from the cable 27 and the conductor within it to slip rings 30 and 31 from which they are picked up by brushes 32 and 33 and carried to the amplifying and controlling panels 34, 35 and 36. The amplifying panel 34 selects and amplifies the incoming signal which indicates the state of balance of the measuring circuit in the well, the amplifying panel 35 selects and amplifies the phasing current from the well and the control panel 36 compares the amplified signal current and the amplified phasing current, makes the necessary correction to the balancing current being sent back to the well and actuates a recorder 37 in accordance therewith. The recorder 37 has its tape driven by a mechanical or electrical transmission system 38 from the measuring wheel 28. Thus a continuous log is made of the gamma radiations encountered versus the depth. A source 39 of 5 kilocycle power may be connected into the cable through the brushes 32 and 33 as shown in dotted lines in Figure 2.

Considering now Figures 3, 4, 5 and 6 to obtain a more detailed understanding of the mechanical structure of the measuring device we find that the ionization chamber is formed by the steel shell 21 which is closed at its opposite ends by metal discs 40 and 41, preferably of steel and welded into place by welds 42 and 43 respectively.

Within the chamber so formed is positioned an outer electrode 44 insulated from the wall of the chamber by a good insulating material 45. It has been found that glass wool fabric impregnated with a synthetic resin is very satisfactory for this purpose.

In the center of the ionization chamber a second electrode 46 is positioned. This electrode is tubular in shape and supported at its top end from a sparkplug-like connection 47 which extends through the top 40 of the ionization chamber. This connector can be described as an ordinary automobile sparkplug with the outer point removed and the inner point lengthened and threaded. The connector as a whole is threaded into the top 40 of the ionization chamber in the same manner that it would be threaded into the head of an automobile engine and is provided with a gasket 48 which prevents leakage of gas around it. At the lower threaded end of the central conduction it carries a plug 49 threaded thereon and locked into position by a locknut 50. The upper end of the tubular central electrode 46 of the ionization chamber fits over this plug 49 and is attached thereto either by reason of the tightness of its fit or by solder, brazing, welding, screw threads or any other expedient means.

The lower end of the tubular central electrode 46 is supported by a cup-like structure 51 which forms a part of the lower end member 41 of the ionization chamber. In this cup member 51 is received the lower end of a quartz rod 52 extending upwardly into the center of the tubular electrode 46. Inside of the tubular electrode the quartz rod is slidably received in a guide member 53 held in position in the tubular electrode by a machine screw 54. The upper end of the quartz rod which passes on through the guide member is received in a slider 55 which is free to slide up and down in the tubular electrode 46 but is yieldably urged downward by a spring 56 which presses at its lower end against the slider 55 and at its upper end against a block 57 fixed within the tubular electrode. Thus the central electrode is well insulated from the casing and the outer electrode and at the same time so mounted that it is not likely to be broken loose from its support by shocks incident to the handling or use of the instrument.

The outer electrode 44 is supported by the insulating material which insulates it from the case and is connected outside the chamber through a second sparkplug-like connector 58, mounted in the bottom closure member 41 of the ionization chamber and provided with a gasket 59 in much the same manner as the connector for the central electrode. This connector, like the one for the central electrode, has no outer point and has an elongated inner point 60 which makes contact with the electrode in the ionization chamber. It is further provided with a helical spring 61 which is attached at its lower end to the central contact point 60 and presses at its upper end against the outer electrode 44 of the ionization chamber to insure good contact. A valve 62 is also provided in the bottom member 41 of the ionization chamber so that the ionization chamber may be filled with the appropriate gas at the appropriate pressure. Argon at 1000 lbs. per sq. in. has been found very satifactory for use in the ionization chamber.

The side walls 21 of the ionization chamber extend somewhat below the bottom closure member 41 and are provided internally with screw threads so that another section of the instrument may be attached. This section 22 is a container for the batteries that apply potential across the electrodes of the ionization chamber. It consists of a relatively short length of steel tubing of the same outside diameter as the ionization chamber. The top end of this tubing is cut away and externally threaded at 63 to fit the threads in the lower end of the ionization chamber. It is closed at the bottom by a disc shaped member 64 welded into place by a weld 65.

In order that the batteries may be expediently placed in this compartment and the proper connections made, a rack 66 is provided. This rack includes a flanged positioning plate 67 so formed as to fit against the bottom plate of the ionization chamber and around the sparkplug-like connector 58 and the valve 62. From this plate extend two strap-like members 68 which carry between them a pair of cross plates 69 and 70 one of which is to be above the batteries and the other of which is to be below the batteries when they are placed in position. The batteries, shown in dotted lines in Figure 5, are then placed in position between the straps 68 and between the plates 69 and 70 and simply tied or taped into position.

The upper plate 69 is provided with openings 71 and 72 through which connections from the batteries may pass and as can be seen these openings are surrounded by insulation so that the wires will not short circuit. The connection from the positive end of the battery to the connector 58 is shown in dotted lines as is also a connector from the negative side of the batteries to a lug 73 on the ionization chamber casing. A spring pressure plate 74 is also provided, which plate is mounted on the lower end of a battery holding frame and arranged to press against the lower end of the casing for the battery compartment when that casing is in place. Thus it prevents the battery supporting structure from vibrating or shaking when the device is assembled.

Above the ionization chamber as has been said, is the third section of steel tubing 23 which encloses the measuring and power supply units. For the purpose of attaching this section of tubing, the side walls of the ionization chamber are arranged, as at the bottom of the ionization chamber, to extend some distance beyond the top closure member 40 of the ionization chamber. A short length of tubing 75 a little larger in diameter than the inside diameter of the ionization chamber case is then machined so that its lower end will slip into the ionization chamber case and welded into place therein by spot welds 76.

The upper end of this short piece of tubing carries screw threads 77 and the lower end of the next higher piece of tubing 23 carries internal screw threads at its lower end so that it may be screwed tightly in place atop the ionization chamber. Within the lower end of this upper piece of tubing 23 is positioned an annular member 78 shaped to fit closely over the short piece of tubing 75 and having a conical section 79 on its upper face so as to position the measuring unit that is to be placed therein. Furthermore, the annular member 78 has a pair of holes 80 drilled longitudinally in it to receive a pair of studs from the measuring unit so as to fix the position of the measuring unit still further.

The measuring unit, designated generally as 81, comprises a long cast metal frame 82 which passes lengthwise along one side of the measuring unit and includes a substantially round plate at each end. At the lower end two positioning studs 83 are counted and arranged so that they will enter the holes 80 in the annular plate 78 when the measuring unit is lowered into position. Surrounding the frame 82 is a metal cylinder 84 which encloses the frame and the parts of the measuring circuit. To simplify the drawings and explanation the parts of the measuring circuit have not been shown, although the circuit diagram for these parts will be found in Figure 7. Fixed to the outside of the cylindrical cover 84 is a soft positioning ring 85 which serves to assist further in positioning the measuring unit in the outer casing and preventing vibration of the unit within the case.

Connection is made between the central electrode of the ionization chamber and the measuring circuit through the connector 47, already described, and through a second connector 86 which is mounted in an insulator 87 in the frame of the measuring unit. The upper end of the connector 47 is arranged as a plug and the lower end of the connector 86 as a socket so that when the measuring unit is slipped into place in the casing the plug and socket will automatically fit together and give the desired connection. Preferably, the plug and socket connection are such that the contacts are spring pressed against each other to insure a firm, low resistance connection at all times.

At the top end of the measuring unit proper a small annulus 89 is affixed to the frame 82 and a sleeve 90 is affixed to this annulus and extends upward for a sufficient distance to enclose the power unit. A resilient positioning ring 91 is preferably attached to the outside of this ring near its lower end so as to still further aid in positioning the measuring unit in the outer casing.

The power unit is enclosed in a cylindrical case 92 of somewhat smaller diameter than the inside of the sleeve 90 and is lowered into the sleeve 90 either before or after the measuring unit is placed in the outer casing. It carries at its lower end a plug connection 93 which cooperates with a socket connection 94 in the upper end of the measuring unit proper. The details of this plug and socket connection have been omitted to simplify the drawings.

Above the top end of the power unit and the shell 90 which surrounds it and extends a little above it, the outer casing 23 is internally threaded. In order to hold the power and measuring units firmly in place, a double tapered annulus 95 is arranged to fit just within the surrounding sleeve 90 and press downwardly and inwardly against the top of the power unit 92. This annulus is held in place by a second annular ring 96 which is tapered to press outwardly against the first ring and threaded so that it can be screwed down inside the outer casing. An externally threaded lock nut 97 secures the second annulus in place.

The next problem is the sealing of the top of the instrument and the anchoring of the supporting cable therein. This is accomplished by screwing a double male plug 98 into the top of the upper casing section 23, covering this with a female-male plug 99 and screwing an anchoring member 100 onto the top of the male-female plug. The electrical connection is carried through the double male plug 98 and through the male-female plug 99 by sparkplug-like connectors 101 and 102 respectively. The connection is made from the power supply unit to the lower of these by a flexible connection 103 and between the two connectors themselves by a plate 104 fixed to the top of the lower one and a helical spring 105 fixed to the bottom of the upper one and arranged to press against the plate. The internal conductor from the supporting cable, which is designated by the numeral 106 is connected directly to the top of the connector 102.

The strands of the cable 27 are spread within the anchoring member 100 and imbedded in lead 107. The anchoring member 100 is then filled with oil through an opening 108 and closed by a set screw. The anchoring member 100 is shaped at its upper end so as to present teeth 109 which may be grasped by a fishing tool should it become impossible to remove the measuring instrument from the well by ordinary means.

As shown in Figures 7 and 8 the power unit enclosed in the cylindrical casing 92 comprises the batteries 110, 111, 112, 113, 114 and 115. The electrical connections to these batteries are shown in Figure 8 along with the gravity-operated switches 116 and 117 for controlling the power supply to the measuring instrument.

We claim:

1. In an apparatus for well surveying, a measuring instrument for lowering into a drill hole that comprises an elongated tubular case sealed against the entrance of well fluids and comprised of at least two sections threaded together, the lower section of which forms the outer walls of an ionization chamber and the upper section of which houses apparatus for measuring the flow of current in the ionization chamber and sending signals indicative of the resultant measurement to the surface of the earth, said measuring apparatus being constructed as a unit adapted to slip into the outer casing and be connected to the ionization chamber by a socket and plug connection and being comprised of two sub units, one containing the measuring circuit and the other containing a power source for operation of the measuring circuit, the unit containing the power source being adapted to slip into one end of the unit containing the measuring circuit and be attached thereto by a plug and socket connection.

2. Apparatus as defined in claim 1 in which each of the two sub units are completely enclosed, each by a metal sleeve, and in which the sub unit containing the measuring unit has attached to it an additional metal sleeve for receiving the power unit.

3. In an apparatus for well surveying, an instrument for lowering into a well that comprises an elongated tubular casing comprising a plurality of sections threaded together, an ionization chamber the outer walls of which are formed by one of said sections, dividing partitions within said section forming end walls for said ionization chamber, an outer cylindrical electrode within said chamber insulated from and supported from the walls thereof, a rod-like inner electrode within said outer electrode insulated from the walls and the outer electrode, a rod-like insulator resiliently mounted in said inner electrode and arranged to support said inner electrode from the outer walls of the chamber at one end, a sparkplug-like connector arranged to support said inner electrode at the opposite end and conduct current therefrom through the partition at that end, a sparkplug-like connector at the opposite end of said chamber arranged to conduct current from the outer electrode through the partition at that end of the chamber, a section of casing threadedly connected to the section forming the ionization chamber, batteries in said second section of casing connected to supply voltage between the casing and the outer electrode, a third section of outer casing threadedly connected at the opposite end of said ionization chamber-containing section, a positioning ring within the casing near the point of junction of the last two mentioned sections, a cylindrical unit housing a measuring circuit within said third section of casing, a pair of prongs on said unit extending longitudinally of said casing and arranged in non-symmetrical relation with respect to the center line of said casing, openings in said positioning ring for receiving said prongs so as to position said unit, a connector mounted in insulating material in the end of said unit and arranged to cooperate with the sparkplug-like connector from the central electrode of said ionization chamber, a frame within said unit for supporting the parts of a measuring circuit, a cylindrical sleeve attached to one end of said unit, a second cylindrical unit containing a power supply for said first cylindrical unit and adapted to be received by said sleeve, plug and socket connections for connecting said units, a double tapered ring for positioning said second unit within said sleeve, a single tapered ring screw threaded into said outer casing for positioning said double tapered ring within said outer casing, a sealing member screw threaded into the top of said third casing section, a sparkplug-like connector passing through said sealing member and connected to said power supuly unit, a second sealing member screw threaded onto said first sealing member, another sparkplug-like connection cooperating with said last mentioned sparkplug-like connection for continuing the connection through said second sealing member, an anchoring member screw threaded onto the second sealing member, a cable having a single insulated conductor in the center thereof for supporting said instrument in the well, means for anchoring said cable in said anchoring member, and an electrical connection between said conductor in said cable and said last mentioned sparkplug-like connector.

4. Apparatus as described in claim 3 in which the anchoring member has a toothed portion which can be grasped by a fishing tool.

5. Apparatus as described by claim 3 in which an opening closed by a set screw is provided in said anchoring member so that the anchoring member can be filled with oil.

SERGE ALEXANDER SCHERBATSKOY.
ROBERT EARL FEARON.
JACOB NEUFELD.
GILBERT SWIFT.

CERTIFICATE OF CORRECTION.

Patent No. 2,376,821.                                                May 22, 1945.

SERGE ALEXANDER SCHERBATSKOY, ET AL.

It is hereby certified that error appears in the printed specification of the above numbered patent requiring correction as follows: Page 3, first column, line 3, for "limit" read --unit--; line 38, for "addiitonal" read --additional--; and second column, line 69, for "duction" read --ductor--; page 4, second column, line 52, for "counted" read --mounted--; page 6, first column, line 8, claim 3, for "supuly" read --supply--; and that the said Letters Patent should be read with this correction therein that the same may conform to the record of the case in the Patent Office.

Signed and sealed this 25th day of September, A. D. 1945.

Leslie Frazer
First Assistant Commissioner of Patents.

(Seal)